United States Patent Office 3,449,359
Patented June 10, 1969

3,449,359
1,5-DIAZABICYCLO-[3.3.0]-OCTANES
Emilio Testa, Tessin, Switzerland, Elvio Bellasio, Como, and Giulio Maffii, Milan, Italy, assignors to Lepetit S.p.A., Milan, Italy
No Drawing. Filed Feb. 7, 1966, Ser. No. 525,364
Claims priority, application Great Britain, Feb. 9, 1965, 5,610/65
Int. Cl. C07d 49/44, 53/00; A61k 27/00
U.S. Cl. 260—310                    7 Claims

ABSTRACT OF THE DISCLOSURE

New 1,5 - diazabicyclo-[3,3,0]-octane-2,6-diodes, prepared from a beta-bromo-propionyl chloride and hydrazine or a 3-pyrazolidinone, and the hydrogenation products of such diones. The compounds possess anti-inflammatory activity.

---

This application is concerned with 1,5-diazabicyclo-[3,3,0]-octane-2,6-diones and their derivatives. More particularly, the compounds of the invention are represented by the formula:

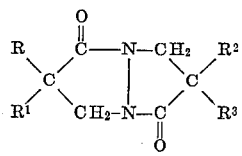

wherein R, $R^1$, $R^2$ and $R^3$ each represent hydrogen, lower alkyl or phenyl.

The process for preparing the new class of compounds which form the subject of this invention consists in refluxing a beta-bromopropionyl chloride having the formula:

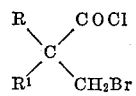    I with an equimolecular amount of a 3-pyrazolidinone having the formula:

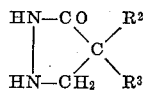    II wherein R, $R^1$, $R^2$ and $R^3$ have the above significance, in the presence of two equimolar amount of a tertiary organic base in an inert anhydrous organic solvent.

By an alternative route, the 1,5-diazabicyclo-[3.3.0]-octane-2,6-diones are prepared by contacting at room temperature beta-bromopropionyl chloride of the above formula I with an equimolecular amount of hydrabine in a solvent at a temperature under 10° C., to obtain a symmetrically substituted hydrazine having the formula:

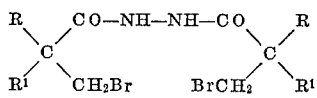

wherein R and $R^1$ still have the above significance. The symmetrical hydrazine is then converted to the octanedione either by simple distillation, or by refluxing in an inert anhydrous organic solvent in the presence of two equimolecular amounts of tertiary organic base.

The 1,5-diazabicyclo[3.3.0]-octanes of the invention possess a high degree of anti-inflammatory activity.

Moreover, they may be converted, if desired, into the corresponding 1,5-diazabicyclo[3.3.0]octanes having the formula:

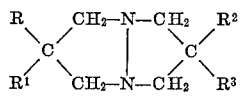

wherein R, $R^1$, $R^2$ and $R^3$ still have the above significance, by hydrogenation with $LiAlH_4$ in a solvent. The hydrogenated derivatives have also desirable pharmacological properties; for example, a derivative of this class, i.e., 3,3,7,7-tetramethyl-1,5-diazabicyclo[3.3.0] - octane, when administered by oral route to rats has shown an average percentage decrease of granuloma of 13.5 in the "granuloma pellet" test.

The anti-inflammatory activity of the new 1,5-diazabicyclo[3.3.0]-octane-2,6-diones is shown by the following table, setting out some members of the group in comparison with the well known agent phenylbutazone. The socalled "granuloma pellet" test was carried out to evaluate the inhibitory activity on the connectival proliferation induced by an inflammatory stimulants. The products were administered by oral route at a does of 100 mg./kg. to adrenectomised rats. The intraperitoneal $LD_{50}$ is also given. Reference is made to the generic formula for the significance of the symbols R.

TABLE

| No. | R | $R^1$ | $R_2$ | $R_3$ | $LD_{50}$ | Percent decrease of granuloma |
|---|---|---|---|---|---|---|
| 1 | n-$C_4H_9$ | n-$C_4H_9$ | n-$C_4H_9$ | n-$C_4H_9$ | 1,000 | −7.5 |
| 2 | n-$C_4H_9$ | n-$C_4H_9$ | $CH_3$ | $CH_3$ | 300 | −8.6 |
| 3 | n-$C_4H_9$ | n-$C_4H_9$ | $C_2H_5$ | $C_2H_5$ | 500 | −9.3 |
| 4 | n-$C_4H_9$ | n-$C_4H_9$ | n-$C_3H_7$ | n-$C_3H_7$ | 1,000 | −10.5 |
| 5 | n-$C_4H_9$ | n-$C_4H_9$ | $C_6H_5$ | H | 1,000 | −10.2 |
| 6 | n-$C_4H_9$ | n-$C_4H_9$ | $C_6H_5$ | $C_6H_5$ | >1,000 | −11.1 |
| 7 | H | H | $C_2H_5$ | $C_2H_5$ | >1,000 | −7.8 |
| Phenylbutazone | | | | | 205 | −7.4 |

The following examples are illustrative of the products and processes of the present invention.

EXAMPLE 1

3,3,7,7-tetramethyl-1,5-diazabicyclo[3.3.0]octane-2,6-dione

To a solution of 13.3 g. of 4,4-dimethyl-3-pyrazolidinone in 300 ml. of anhydrous benzene a solution of 23.2 g. of alpha-alpha-dimethyl-beta-bromopropionyl chloride in 30 ml. of anhydrous benzene is cautiously added, followed by a solution of 29.4 g. of triethylamine in 40 ml. of benzene. After heating for 8 hours to reflux, the mixture is cooled, filtered and the filtrate evaporated to dryness in vacuo. The residue is recrystallised from petroleum ether-isopropyl ether mixture. Yield 15 g. (66%). The compound has M.P. 158–160° C.

EXAMPLE 2

3-phenyl-7,7-dibutyl - 1,5 - diazabicyclo[3.3.0]octane-2,6-dione

To a solution of 13.5 g. of 4,4-dibutyl-3-pyrazolidinone in 120 ml. of benzene a soltuion of 16.88 g. of alphaphenyl-beta-bromopropionyl chloride in 50 ml. of benzene is added gradually, followed by 17.2 g. of triethylamine in 50 ml. of benzene. After heating to reflux for 9 hours the mixture is worked up as in the preceding example. The residue from benzene is distilled collecting at 200–202° C./0.5 mm. Yield 15.7 g. (70%).

EXAMPLES 3 TO 13

By a process analogous to that set out in Examples 1 and 2 the following 1,5-diazabicyclo[3.3.0]octane-2,6-diones were prepared, of which the yield and properties are given (reference is made to the generic formula for the significance of the symbols R).

| | R | $R_1$ | $R_2$ | $R_3$ | M.P. °C. (or B.P. °C./mm.) | Yield percent |
|---|---|---|---|---|---|---|
| 3 | H | H | n-$C_4H_9$ | n-$C_4H_9$ | 156–160/0.8 | 88 |
| 4 | H | n-$C_3H_7$ | n-$C_4H_9$ | n-$C_4H_9$ | 159–162/0.15 | 56 |
| 5 | $CH_3$ | $CH_3$ | n-$C_4H_9$ | n-$C_4H_9$ | 146–147/0.6 | 80 |
| 6 | $C_2H_5$ | $C_2H_5$ | n-$C_4H_9$ | n-$C_4H_9$ | 163–164/0.6 | 89 |
| 7 | n-$C_3H_7$ | n-$C_3H_7$ | n-$C_4H_9$ | n-$C_4H_9$ | 158–160/0.2 | 76 |
| 8 | n-$C_4H_9$ | n-$C_4H_9$ | n-$C_4H_9$ | n-$C_4H_9$ | 183–184/0.5 | 83 |
| 9 | $C_2H_5$ | $C_6H_5$ | n-$C_4H_9$ | n-$C_4H_9$ | 194–195/0.3 | 84 |
| 10 | $C_6H_5$ | $C_6H_5$ | n-$C_4H_9$ | n-$C_4H_9$ | 205/0.1 | 73 |
| 11 | $C_2H_5$ | $C_6H_5$ | $C_2H_5$ | $C_6H_5$ | 123–127 | 63 |
| 12 | $C_6H_5$ | H | n-$C_4H_9$ | H | 115–118 | 51 |
| 13 | $C_6H_5$ | H | $C_6H_5$ | H | 193–195 | 62 |

EXAMPLE 14

3,3,7,7 - tetrapropyl - 1,5 - diababicyclo[3.3.0]octane-2,6-dione

Into a solution of 19 g. of alpha, alpha-dipropyl-beta-bromopropionyl chloride in 100 ml. of benzene, 2.39 g. of hydrazine hydrate are slowly added with external cooling. The mixture is then heated at 60° C. for 2 hours, cooled and diluted with 100 ml. of benzene and 50 ml. of water. The benzene layer is separated and concentrated to a small volume, then an equal volume of petroleum ether is added. The white precipitate is N,N'-di-(alpha,alpha-dipropyl-beta-bromo-propionyl) - hydrazine, M.P. 164–168° C. Yield 12.5 g. (75%). A mixture of 7.6 g. of this hydrazine, 8.27 g. of triethylamine and 400 ml. of benzene is refluxed for 2 hours. After cooling and filtration, the solvent is distilled off giving 2.3 g. (yield 46%) of 3,3,7,7-tetrapropyl-1,5-diazabicyclo-[3.3.0] - octane - 2,6-dione, M.P. 70–71° C (from petroleum ether).

EXAMPLE 15

3,3,7,7-tetrabutyl - 1,5 - diazabicyclo[3.3.0]octane - 2,6-dione

Equimolecular amounts of alpha, alpha-dibutyl-beta-bromopropionyl chloride and hydrazine hydrate are reacted under the conditions described in Example 14. The residue from benzene is distilled and goes over at 190° C./1 mm. Yield 36% of 3,3,7,7-tetra-butyl-1,5-diazabicyclo[3.3.0]octane-2,6-dione.

EXAMPLE 16

3,3,7,7-tetramethyl-1,5-diazabicyclo[3.3.0]octane

To an amount of 8.34 g. of $LiAlH_4$ in 160 ml. of tetrahydrofuran, 10.8 g. of 3,3,7,7-tetramethyl-1,5-diazabicyclo [3.3.0]-octane-3,6-dione dissolved in 100 ml. of the same solvent are slowly added at 0° C. and under stirring. The mixture is refluxed for 6 hours, then another amount of 4.5 g. of $LiAlH_4$ (4.5 g.) is added and the mixture is again refluxed for 5 hours. Water is then added at 0° C. under stirring. The mixture is filtered and the filtrate is concentrated in vacuo, the residue is taken up with diethyl ether, the mixture is filtered and the filtrate is concentrated in vacuo. The oily liquid so obtained is distilled, thus yielding 5 g. (62.5%) of 3,3,7,7-tetramethyl-1,5-diazabicyclo[3.3.0]octane.

What we claim is:

1. A compound of the formula

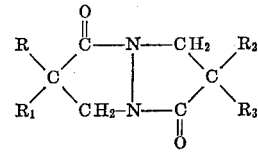

wherein R, $R_1$, $R_2$, and $R_3$ are each a member of the class consisting of hydrogen, lower alkyl, and phenyl.

2. 3,3 - di - n - butyl - 7,7-di-n-propyl-1,5-diazabicyclo [3.3.0]octane-2,6-dione.

3. 3,3 - di - n - butyl - 7 - phenyl-1,5-diazabicyclo [3.3.0]octane-2,6-dione.

4. 3,3 - di - n - butyl-7,7-diphenyl-1,5-diazabicyclo [3.3.0]octane-2,6-dione.

5. 7,7 - diethyl-1,5-diazabicyclo[3.3.0]octane-2,6-dione.

6. 3,3,7,7 - tetramethyl-1,5-diazabicyclo[3.3.0]octane.

7. A compound of the formula

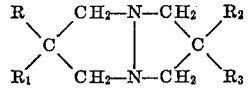

wherein one of the groups, R, $R_1$, $R_2$, and $R_3$ is a member of the class consisting of hydrogen, lower alkyl and phenyl, while the others are each a member of the class consisting of lower alkyl and phenyl.

References Cited

UNITED STATES PATENTS 2,790,807  4/1957  Wagner et al.
2,831,865  4/1958  Hafliger et al.

OTHER REFERENCES

Bellasio et al. I Chem. Abst. vol. 63, col. 9945.
Bellasio et al. II Index Chemicos vol. 18, No. 55808.
Büchi et al. Helv. Chim. Acta Vol. 45 pp. 37–42 (1962).
Buhle et al. Jour. Amer. Chem. Soc. vol. 65, pp. 29–32 (1943), copy in Patent Office Scientific Library.

HENRY R. JILES, *Primary Examiner.*

NATALIE TROUSOF, *Assistant Examiner.*

U.S. Cl. X.R.

260—544, 558, 561, 999